United States Patent [19]
Breitkreutz et al.

[11] Patent Number: 5,785,141
[45] Date of Patent: Jul. 28, 1998

[54] MOTORCYCLE CHASSIS AND SWING ARM COMBINATION

[75] Inventors: Steven Breitkreutz, Rochester; David Zhi Xia, Edmonton, both of Canada

[73] Assignees: John Lehman, Westlock; Larry David Stricchuk, Spruce Grove, both of Canada

[21] Appl. No.: 784,190

[22] Filed: Jan. 15, 1997

[30] Foreign Application Priority Data

Jan. 18, 1996 [CA] Canada ................................ 2167560

[51] Int. Cl.⁶ .................................................. B62D 61/02
[52] U.S. Cl. .................................................. 180/219; 280/284
[58] Field of Search ................................ 180/219, 227; 280/284; 411/535, 536, 542, 370, 915

[56] References Cited

U.S. PATENT DOCUMENTS 5,487,443 1/1996 Thurm ................................ 180/227

*Primary Examiner*—Robert J. Oberleitner
*Assistant Examiner*—C. T. Bartz
*Attorney, Agent, or Firm*—Anthony R. Lambert

[57] ABSTRACT

A motorcycle chassis having two axially aligned internally threaded pin receiving bushings secured in axially aligned passages extending through opposed sides of the motorcycle chassis;

a swing arm having opposed ends in which are positioned bearings, the bearing having axially aligned pin receiving apertures;

a pair of mounting pins, each of the mounting pins having a first end, a second end, and an externally threaded body, the externally threaded body being sized to mate with the internally threaded pin receiving bushings;

a sleeve having a first end, a second end, an external diameter sized to fit within the passages of the motorcycle chassis and an internal diameter slightly larger than the external diameter of the body of the mounting pin, such that the sleeve slides over the mounting pin, the second end of the sleeve having a flange;

threaded main body of each of the mounting pins being mated with the internally threaded pin receiving bushings in the motorcycle chassis until the first end of the mounting pins is positioned within pin receiving apertures of the swing arm;

the first end of the sleeve being positioned over the body of the mounting pin with the first end of the sleeve abutting against the bushing and the flange at the second end of the sleeve engaging the motorcycle chassis; and a nut securing the sleeve in position.

2 Claims, 5 Drawing Sheets

MOTORCYCLE CHASSIS AND SWING ARM COMBINATION

FIELD OF THE INVENTION

The present invention relates to a method of attaching a swing arm to a motorcycle chassis and, in particular, the method at it relates to converting a motorcycle to a tricycle.

BACKGROUND OF THE INVENTION

When a motorcycle is converted to a tricycle, a pair of rear wheels are mounted to the motorcycle chassis by means of a swing arm. This swing arm rides up and down as part of the vehicles suspension system. The swing arm can either be externally or internally positioned relative to the motorcycle chassis. A major problem with existing methods of attaching a swing arm is the severe stress is caused on the pin connection area of the motorcycle frame. The thickness of the motorcycle frame at the connection area is only 2 mm. The ability of this structure to support external forces is limited. A frame of this type can only bear about 3600 pounds of external force at the connection area. However, the forces acting upon this area greatly exceed 3600 pounds when the motorcycle is converted to a tricycle. These excessive force cause the motorcycle chassis to spread and creates movement of bushings positioned within passages in the motorcycle chassis that hold the mounting pins. The spreading of the frame and the movement of the bushings causes metal fatigue which, over time results in cracks developing in the motorcycle frame in the vicinity of the pin connection.

SUMMARY OF THE INVENTION

What is required is a method for attaching a swing arm to a motorcycle chassis that is better suited for motorcycle to tricycle conversions.

According to one aspect of the present invention there is provided a method for attaching a swing arm to a motorcycle chassis. First, provide a motorcycle chassis having two axially aligned internally threaded pin receiving bushings secured in axially aligned passages extending through opposed sides of the motorcycle chassis. Second, provide a swing arm having opposed ends in which are positioned bearings, the bearing having axially aligned pin receiving apertures. Third, provide mounting pins. Each of the mounting pins has a first end, a second end, and an externally threaded body. The externally threaded body is sized to mate with the internally threaded pin receiving bushings. Fourth, provide a sleeve having a first end and a second end. The sleeve has an external diameter sized to fit within the passages of the motorcycle chassis. The sleeve has an internal diameter slightly larger than the external diameter of the body of the mounting pin, such that the sleeve slides over the mounting pin. The second end of the sleeve has a flange. Fifth, mating the threaded main body of each of the mounting pins with the internally threaded pin receiving bushings in the motorcycle chassis until the first end of the mounting pins is positioned within pin receiving apertures of the swing arm, thereby securing the swing arm to the motorcycle chassis. Sixth, slide the first end of the sleeve over the body of the mounting pin until the first end of the sleeve abuts against the bushing and the flange at the second end of the sleeve engages the motorcycle chassis. Seventh, secure a nut onto the second end of the mounting pin thereby maintaining the sleeve in position.

With the above described method, the motorcycle chassis is prevented from spreading by the clamping function of the flange. Movement of the bushing is retarded by having the second end of the sleeve abut the bushing. By selection of an appropriate sized flange, the force per square inch upon the motorcycle chassis can be greatly reduced, as such forces are spread across a wider surface area by means of the flange. In any particular application, the size of the flange required can be easily calculated by taking the maximum forces that the motorcycle chassis must withstand and determining the area over which those forces must be dispersed in order to ensure they are within performance limits.

Although beneficial results may be obtained through the use of the method, as described above, the size of the flange may be reduced when an annular reinforcing member is secured to the motorcycle chassis encircling the passage and the flange at the second end of the sleeve engages the annular reinforcing member. This reinforces the motorcycle chassis around each of the threaded pin receiving apertures. In such cases the forces exerted upon the motorcycle chassis are spread not only by the flange, but also by the annular reinforcing members.

According to another aspect of the present invention there is provided a motorcycle chassis and swing arm, in combination. A motorcycle chassis is provided having two axially aligned internally threaded pin receiving bushings secured in axially aligned passages extending through opposed sides of the motorcycle chassis. A swing arm is provided having opposed ends in which are positioned bearings. The bearings have axially aligned pin receiving apertures. A pair of mounting pins are provided. Each of the mounting pins has a first end, a second end, and an externally threaded body. The externally threaded body is sized to mate with the internally threaded pin receiving bushings. A sleeve is provided having a first end and a second end. The sleeve has an external diameter sized to fit within the passages of the motorcycle chassis. The sleeve has an internal diameter slightly larger than the external diameter of the body of the mounting pin, such that the sleeve slides over the mounting pin. The second end of the sleeve has a flange. The threaded main body of each of the mounting pins is mated with the internally threaded pin receiving bushings in the motorcycle chassis until the first end of the mounting pins is positioned within pin receiving apertures of the swing arm. The sleeve is positioned over the body of the mounting pin with the first end of the sleeve abutting against the bushing and the flange at the second end of the sleeve engaging the motorcycle chassis. A nut is secured to the second end of the mounting pin, thereby maintaining the sleeve in position.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method for attaching a swing arm to a motorcycle chassis will now be described with reference to FIGS. 1 through 5.

Figure 1:
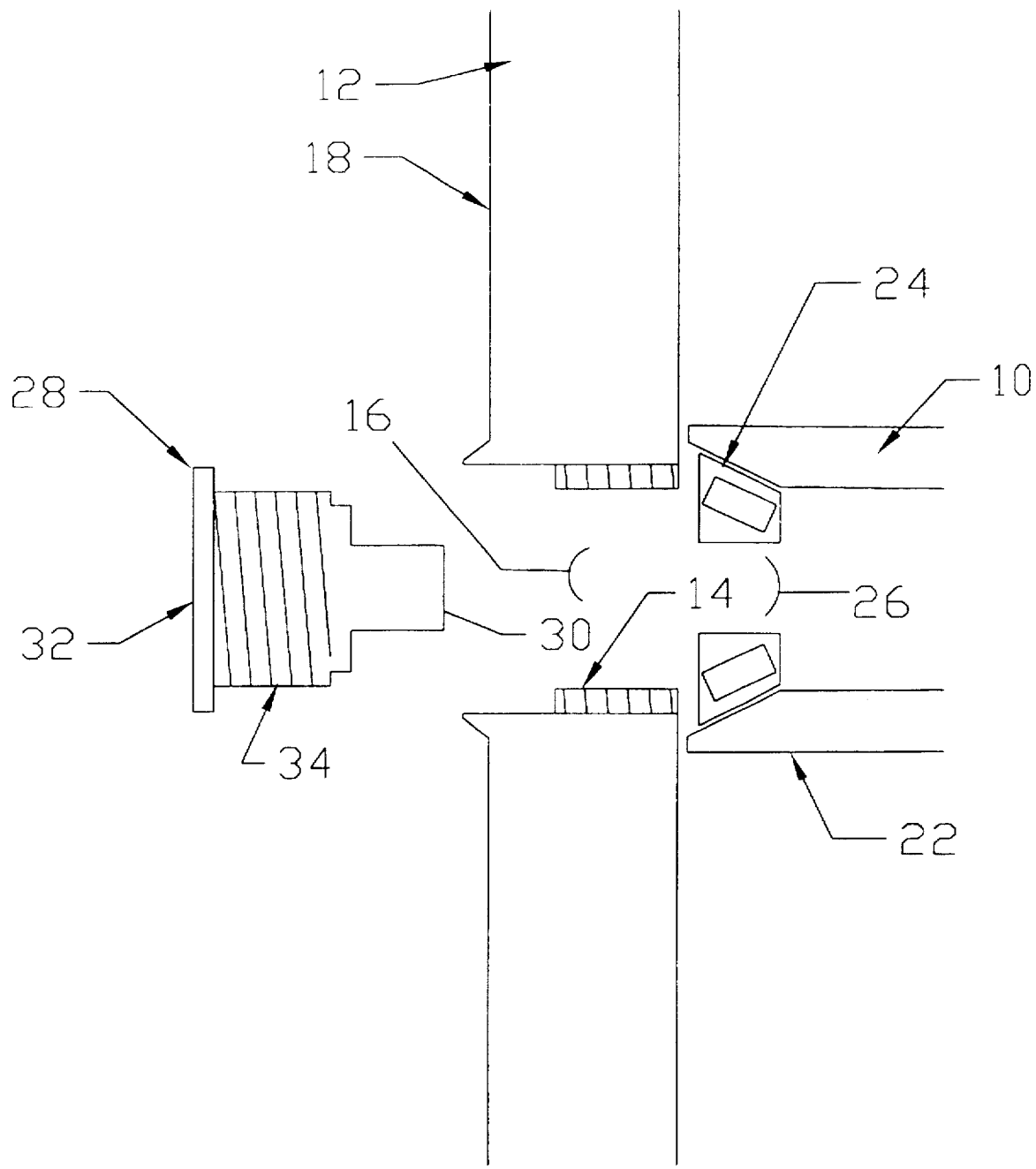
FIG. 1 is an exploded top plan view labelled as PRIOR ART of components used to secure a swing arm to a motorcycle chassis in accordance with the teachings of the prior art.
Figure 2:
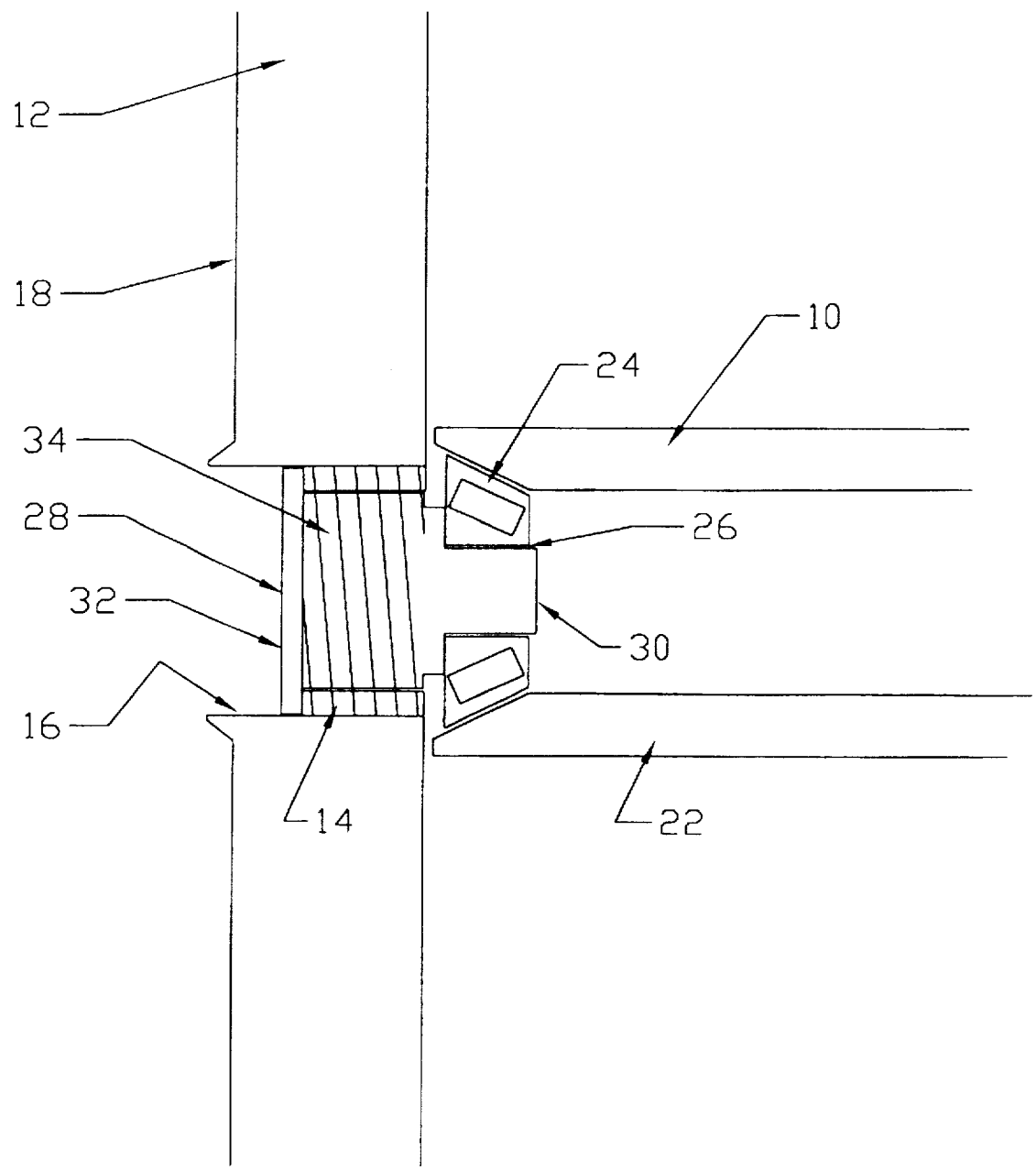
FIG. 2 is a top plan view labelled as PRIOR ART of components used to secure a swing arm to a motorcycle chassis in accordance with the teachings of the prior art.

Referring to FIGS. 1 and 2, there is illustrated a swing arm 10 attached to a motorcycle chassis 12 in accordance with the teachings of the PRIOR ART. Axially aligned internally threaded pin receiving bushings 14 secured in axially aligned passages 16 extending through opposed sides 18 of motorcycle chassis 12. Swing arm 10 has opposed ends 22 in which are positioned bearings 24. Bearings 24 have axially aligned pin receiving apertures 26. Mounting pins 28 are provided. Each of mounting pins 28 have a first end 30, a second end 32, and an externally threaded body 34. Externally threaded body 34 of mounting pin 28 is sized to mate with internally threaded pin receiving bushings 14. Swing arm 10 is secured to motorcycle chassis 12 by mating externally threaded body 34 of each of mounting pins 28 with internally threaded pin receiving bushings 14 in motorcycle chassis 12 until first end 30 of mounting pins 28 is positioned within pin receiving apertures 26 of the bearings 24 of swing arm 10.

Figure 3:
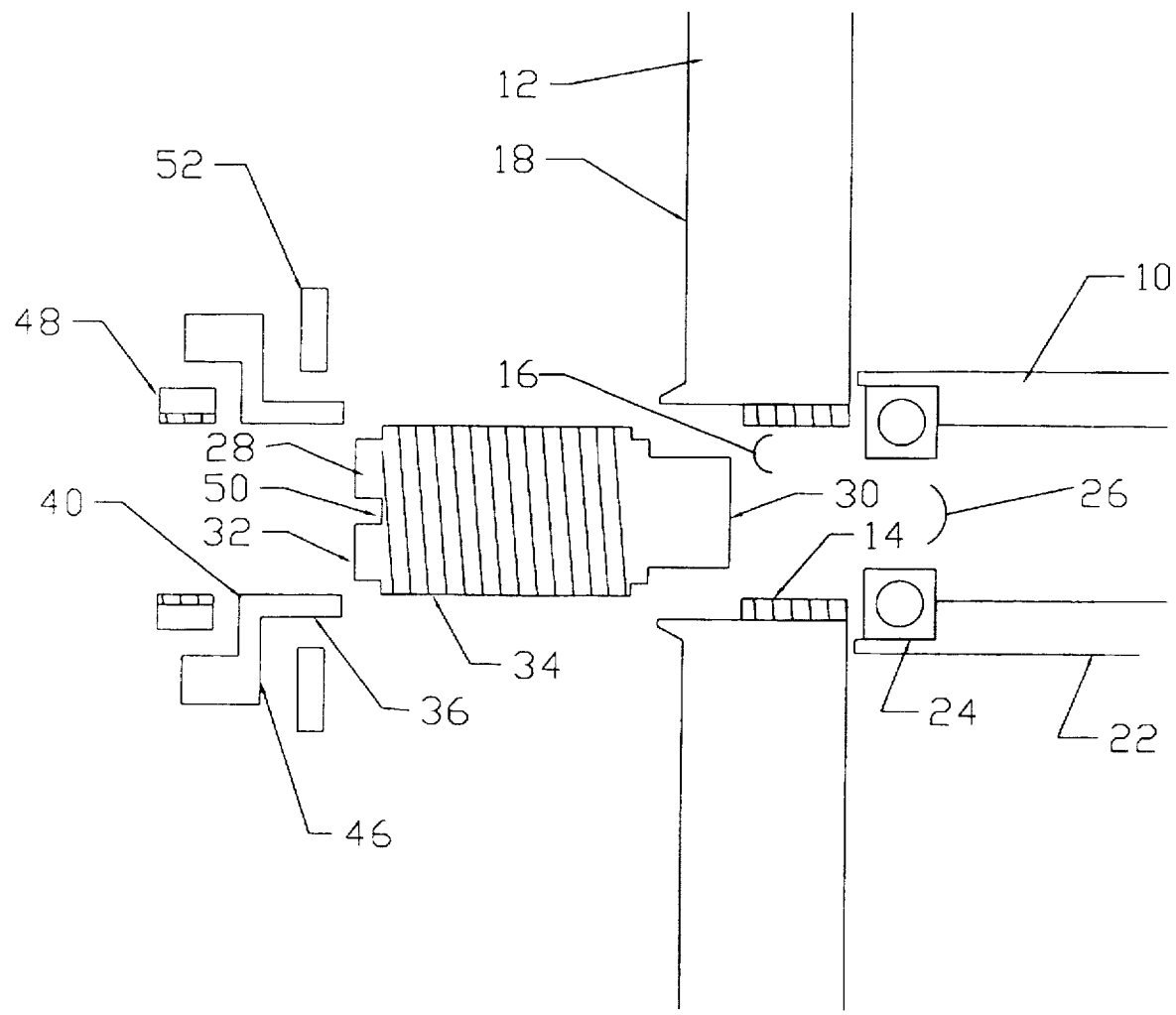
FIG. 3 is an exploded top plan view of components used to secure a swing arm to a motorcycle chassis in accordance with the teachings of the present invention.
Figure 4:
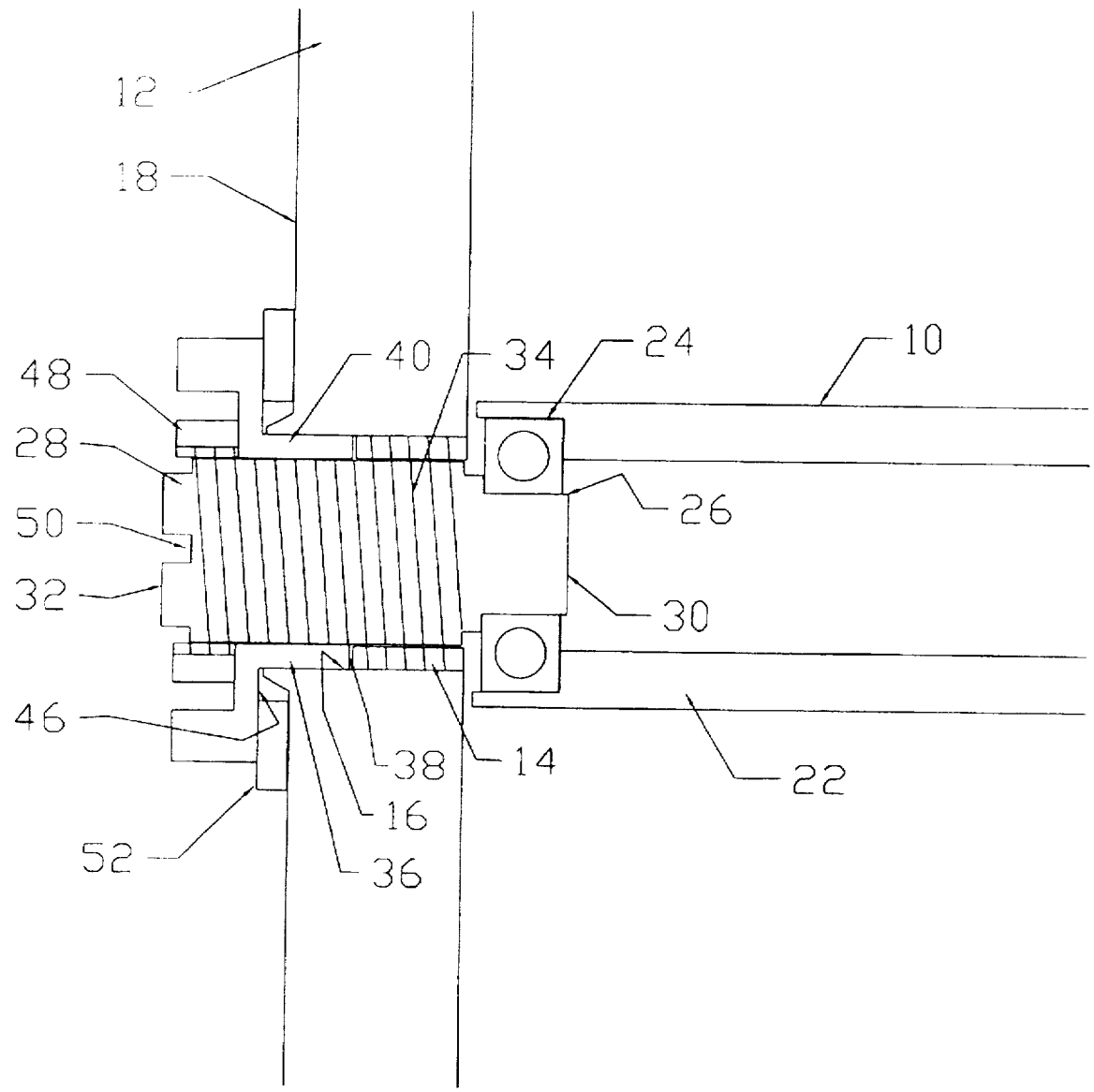
FIG. 4 is a top plan view of components used to secure a swing arm to a motorcycle chassis in accordance with the teachings of the present invention.
Figure 5:
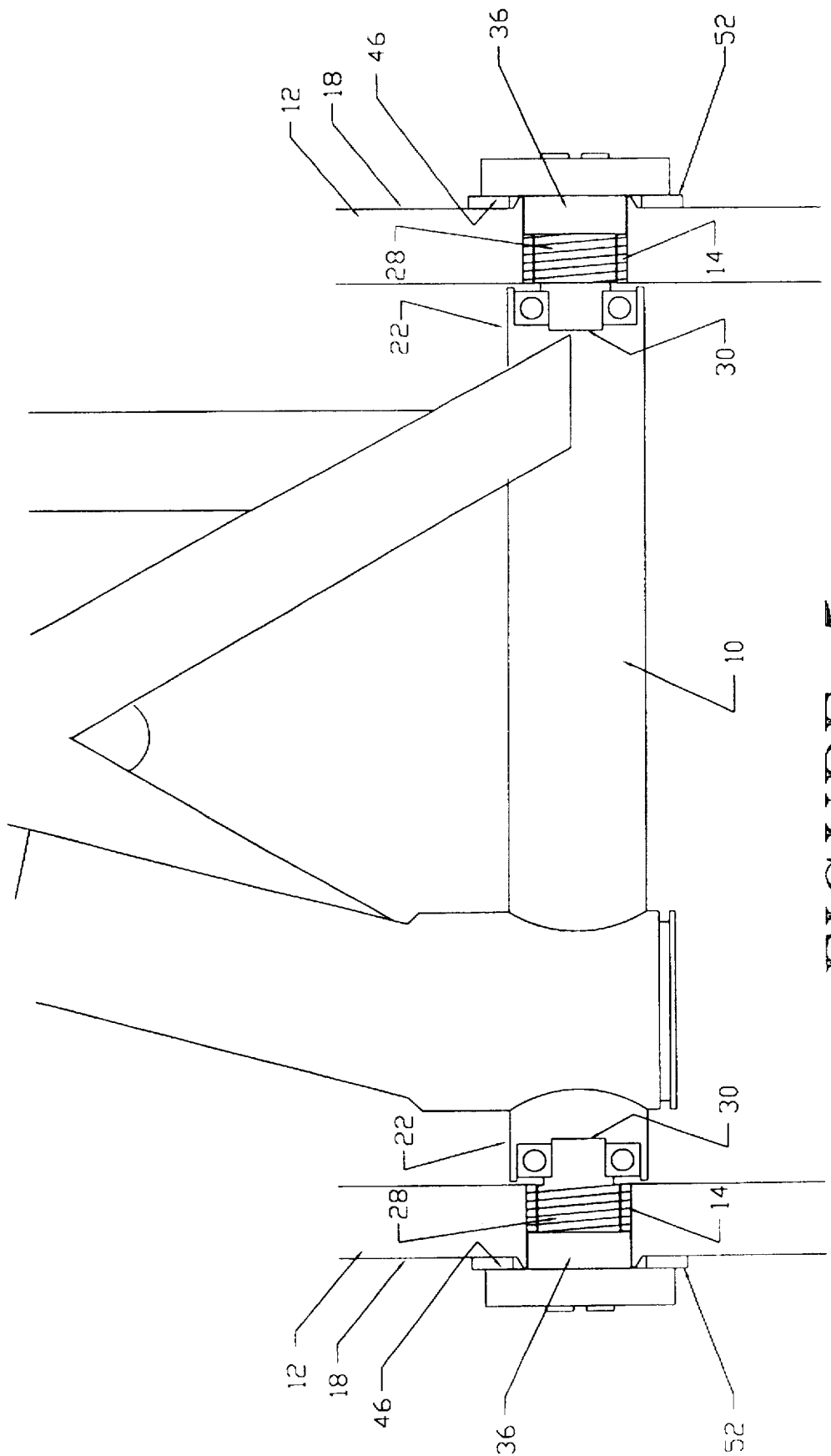
FIG. 5 is a top plan view of a swing arm attached to a motorcycle chassis in accordance with the teachings of the present invention.

As previously described, such a method of attachment is subject to cracking and fatigue. Referring to FIGS. 3 through 5, additional components required to reduce or eliminate cracking will now be described. A sleeve 36 is provided having a first end 38 and a second end 40. Sleeve 36 has an external diameter sized to fit within passages 16 of motorcycle chassis 12. Sleeve 36 has an internal diameter slightly larger than externally threaded body 34 of mounting pin 28, such that sleeve 36 is able to slide over mounting pin 28. Second end 40 of sleeve 36 has a broad flange 46. Once sleeve 36 is slid into place, a nut 48 secured to second end 32 of mounting pin 28 is used to prevent sleeve 36 from being withdrawn past from second end 32 of mounting pin 28. As will be hereinafter further described, a longer version of mounting pin 28 is required in order to follow the teachings of the preferred method. A slot 50 is positioned on second face 32 of mounting pin 28 to receive a tool (not shown) by means of which mounting pin 28 is turned. In addition, there is provided an annular oversized washer-like reinforcing member 52.

Referring to FIGS. 3 through 5, the preferred method for attaching swing arm 10 to motorcycle chassis 12 will now be described. First, provide motorcycle chassis 12 having axially aligned internally threaded pin receiving bushings 14. Bushings 14 are secured in axially aligned passages 16 extending through opposed sides 18 of motorcycle chassis 12. Second, provide swing arm 10 having opposed ends 22 in which are positioned bearings 24. Bearings 24 have axially aligned pin receiving apertures 26. Third, provide mounting pins 28 which are longer than standard mounting pins. Each of mounting pins 28 have a first end 30, a second end 32, and an externally threaded body 34. Externally threaded body 34 is sized to mate with internally threaded pin receiving bushings 14. Fourth, provide an annular reinforcing member 52 and secure annular reinforcing member 52 to motorcycle chassis 12 encircling passage 16. The preferred method of securing annular reinforcing member 52 is with high strength adhesives, although there are other alternative means, such as welding. Fifth, insert mounted pins 28 into passages 16 in motorcycle chassis 12 and mate threaded main body 34 of each of mounting pins 28 with internally threaded pin receiving bushings 14. Mounting pins 28 should be tightened relative to bushings 14 until first ends 30 of mounting pins 28 are positioned within pin receiving apertures 26 of bearings 24 in swing arm 10, thereby securing swing arm 10 to motorcycle chassis 12. Sixth, provide sleeve 36 having first end 38 and second end 40. Sleeve 36 has an external diameter sized to fit within passages 16 of motorcycle chassis 12. Sleeve 36 has an internal diameter slightly larger than an external diameter of threaded main body 34 of mounting pin 28, such that sleeve 36 slides over mounting pin 28. Second end 40 of sleeve 36 has a broad flange 46, the function of which will hereinafter be further described. Seventh, slide first end 38 of sleeve 36 over body 34 of mounting pin 28 until first end 38 of sleeve 36 abuts against bushing 14 with flange 46 at second end 40 of sleeve 36 engages annular reinforcing member 52. Eighth, secure nut 48 onto second end 32 of mounting pin 28, thereby maintaining sleeve 36 in position.

The underlying purpose of the above described method is to prevent motorcycle chassis 12 from spreading and to prevent movement of bushings 14 within passages 16. Flange 46 serves to clamp motorcycle chassis 12, thereby preventing motorcycle chassis 12 from spreading. First end 38 of sleeve 36 abutting against bushing 14 serves to retard movement of bushing 14. Force acts upon an area. The size of flange 46 is intentionally large so as to spread the force over a wide area. The size of flange 46 can be reduced if used in conjunction with annular reinforcing member 52.

The size of sleeve 36, flange 46 and annular reinforcing member 52 will vary with the make and model of motorcycle. Beneficial results have been obtained with the present method in the conversion of a HONDA GOLDWING 1500 (Trademark) motorcycle. The form of sleeve 36 used with Honda Goldwing 1500 had an internal diameter of 1 3/16 inches, an external diameter of 1 8/16 inches, while flange 32 has an external diameter of 2 12/16 inches. The form of annular reinforcing member 52 used with the Honda Goldwing 1500 had a thickness of 3/16 inch, an internal diameter of 1 15/16 inches, and an external diameter of 3 2/16 inches.

Referring to FIGS. 1 and 2, in the PRIOR ART the ends of swing arm 10 in which bearings 24 were positioned tended to be conical shaped cups. When subject to excessive forces bearings 24 tended to ride out of these cups. It is, therefore, recommended that bearings 24 be positioned in cylindrical cups and that this problem be considered when selecting bearing 24.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. In combination:
    a motorcycle chassis having two axially aligned internally threaded pin receiving bushings secured in axially aligned passages extending through opposed sides of the motorcycle chassis;
    a swing arm having opposed ends in which are positioned bearings, the bearing having axially aligned pin receiving apertures;
    a pair of mounting pins, each of the mounting pins having a first end, a second end, and an externally threaded body, the externally threaded body being sized to mate with the internally threaded pin receiving bushings;
    a sleeve having a first end, a second end, an external diameter sized to fit within the passages of the motorcycle chassis and an internal diameter slightly larger than the external diameter of the body of the mounting pin, such that the sleeve slides over the mounting pin, the second end of the sleeve having a flange;

threaded main body of each of the mounting pins being mated with the internally threaded pin receiving bushings in the motorcycle chassis until the first end of the mounting pins is positioned within pin receiving apertures of the swing arm;

the first end of the sleeve being positioned over the body of the mounting pin with the first end of the sleeve abutting against the bushing and the flange at the second end of the sleeve engaging the motorcycle chassis; and a nut secured to the second end of the mounting pin, thereby maintaining the sleeve in position.

2. The combination as defined in claim 1, wherein an annular reinforcing member is secured to the motorcycle chassis encircling the passage and the flange at the second end of the sleeve engages the annular reinforcing member.

* * * * *